Patented Aug. 29, 1939

2,170,807

UNITED STATES PATENT OFFICE 2,170,807

MEROCYANINE DYES FROM BARBITURIC ACIDS

Leslie G. S. Brooker, Rochester, N. Y., assignor to Eastman Kodak Company, Rochester, N. Y., a corporation of New Jersey No Drawing. Application February 25, 1938, Serial No. 192,611

8 Claims. (Cl. 260—240)

This invention relates to dyes from barbituric acids and more particularly to what can be called merocarbocyanine dyes from barbituric acids.

This application is a continuation-in-part of my co-pending application Serial No. 739,502, filed August 11, 1934.

I have found that barbituric acids can be condensed with cyclammonium quaternary salts containing a β-arylaminovinyl group in the alpha or gamma position, i. e., one of the so-called reactive positions, in the presence of a basic condensing agent, to give dyes useful in the preparation of optically sensitized emulsions and in the preparation of light filters.

It is, accordingly, an object of my invention to provide new dyes derived from barbituric acids, i. e., 2,4,6-triketohexahydropyrimidines. A further object is to provide a process for the preparation of such dyes. Other more specific objects will become apparent hereinafter.

My new dyes can be represented by the following general formulas:

I. 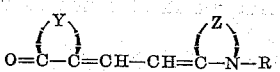

and

II. 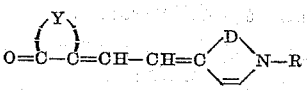

wherein D represents a vinylene or phenylene group, R represents an alkyl group, such as methyl, ethyl, n-amyl, allyl, β-ethoxyethyl, benzyl or β-carboxyethyl for example, Y represents the non-metallic atoms necessary to complete a barbituric acid nucleus, such as an ordinary barbituric acid nucleus, a 2-thiobarbituric acid nucleus or a 3-alkylbarbituric acid nucleus for example, and Z represents the non-metallic atoms necessary to complete a heterocyclic nucleus, such as a five-membered or six-membered heterocyclic nucleus. More specifically, Z can represent the non-metallic atoms necessary to complete a thiazole nucleus, such as an unsubstituted thiazole nucleus, a 4-phenylthiazole nucleus, a 5-methyl-4-phenylthiazole nucleus, a benzothiazole nucleus, a naphthothiazole nucleus or a 4-chlorbenzothiazole nucleus for example, an oxazole nucleus, such as a 4-phenyloxazole nucleus, a benzoxazole nucleus or a naphthoxazole nucleus for example, a selenazole nucleus, such as a 4-phenylselenazole nucleus or a benzoselenazole nucleus for example, a quinoline nucleus, such as a 5-methylquinoline or a 5,6-benzoquinoline nucleus for example, or a pyridine nucleus.

In preparing my new dyes according to my invention, I react a barbituric acid with a cyclammonium quaternary salt containing a β-arylaminovinyl group in the alpha or gamma position. Acylated β-arylaminovinyl derivatives are advantageously employed. The condensations are effected in the presence of a basic condensing agent. The aforesaid β-arylaminovinyl derivatives are well known and are prepared by condensing a cyclammonium quaternary salt containing a reactive methyl group in the alpha or gamma position with a diarylformamidine. By carrying out the condensations in the presence of organic acid anhydrides, the acylated β-arylaminovinyl derivatives are obtained. Alternatively the β-arylaminovinyl derivatives can be first prepared and then these can be treated with organic acid anhydrides to obtain the β-arylaminovinyl derivatives.

As basic condensing agents employed in my process for preparing my new dyes, I have found that strong organic bases, i. e., organic bases whose aqueous solutions have dissociation constants substantially greater than an aqueous solution of pyridine, are advantageously employed. Typical strong organic bases are: triethylamine, piperidine, N-methylpiperidine, triethanolamine and tributylamine. Other basic condensing agents can be employed, for example sodium acetate or propionate or sodium or potassium carbonate.

My new dye condensations are advantageously effected in the presence of a diluent. Lower aliphatic alcohols, i. e., those of the formula

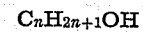

wherein $n$ represents a positive integer not greater than four, are advantageously employed. Heat accelerates the formation of my new dyes.

While the process of preparing my new dyes is subject to variation particularly as respects the nature and quantity of barbituric acid employed, the nature and quantity of β-arylaminovinyl derivative employed, the nature and quantity of basic condensing agent employed, the nature and quantity of diluent, if any, employed, the temperatures employed and the method of isolation and purification of the dyes, the following examples will serve to illustrate the manner of obtaining my new dyes. These examples are not intended to limit my invention.

EXAMPLE 1.—5-(2-ethyl-1-benzoxazylidene-ethylidene)-2,4,6-triketohexahydropyrimidine

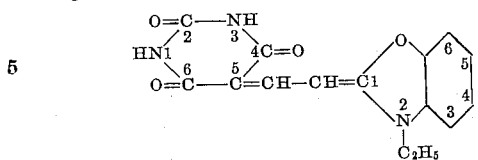

1.3 parts of barbituric acid and 4.3 parts of 1-(β-acetanilidovinyl)-benzoxazole ethiodide were refluxed with 35 parts of absolute ethyl alcohol and 1.06 parts of triethylamine for about twenty minutes. The dye was filtered from the cooled reaction mixture. It was recrystallized from glacial acetic acid and obtained as bright yellow crystals which gave a yellow methyl alcohol solution.

EXAMPLE 2.—5-(2-ethyl-1-benzothiazylidene-ethylidene)-2,4,6-triketohexahydropyrimidine

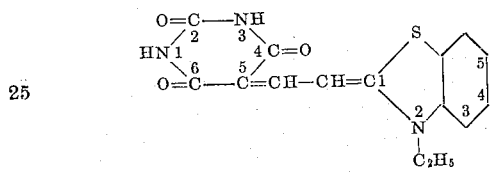

2.6 parts of barbituric acid, 9 parts of 1-(β-acetanilidovinyl)-benzothiazole ethiodide and 1.8 parts of anhydrous sodium acetate were suspended in 50 parts of acetic anhydride. This mixture was heated at a temperature just under the boiling point for about one minute. The dye separated from the cooled reaction mixture and was filtered off. It was recrystallized from dilute acetic acid, yielding minute crystals having a blue reflex and giving a yellow-orange methyl alcohol solution.

EXAMPLE 3.—5-(2-ethyl-1-benzoxazylidene-ethylidene)-2-thio-2,4,6-triketohexahydropyrimidine

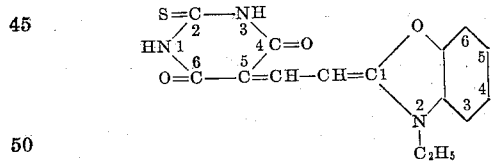

1.4 parts of thiobarbituric acid and 4.3 parts of 1-(β-acetanilidovinyl)-benzoxazole ethiodide were refluxed in 3 parts of absolute ethyl alcohol and 1.06 parts of triethylamine for about twenty minutes. The dye was filtered from the cooled solution. It was recrystallized from glacial acetic acid and obtained as an orange-yellow crystalline powder which gave a yellow methyl alcohol solution.

EXAMPLE 4.—5-(3-methyl-2-thiazolinylidene-ethylidene)-2,4,6-triketohexahydropyrimidine

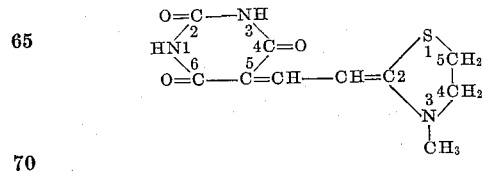

3.14 parts of 2-(β-anilinovinyl)-thiazoline methiodide, 1.3 parts of barbituric acid and 1.0 part of triethylamine were heated at the refluxing temperature in 25 cc. of absolute ethyl alcohol for about fifteen minutes. The orange dye separated from the chilled reaction mixture. It was filtered off and washed with methyl alcohol. It was recrystallized from glacial acetic acid and obtained as orange crystals.

EXAMPLE 5.—5-(ethyl-2-β-naphthothiazylidene-ethylidene)-2,4,6-triketohexahydropyrimidine

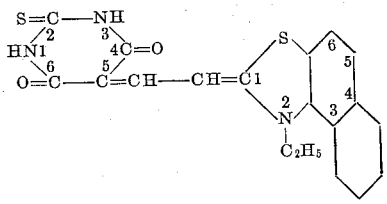

2.5 parts of 2-(β-acetanilidovinyl)-β-naphthothiazole ethiodide, 0.72 part of thiobarbituric acid and 0.5 part of triethylamine were heated at the refluxing temperature in 25 cc. of absolute ethyl alcohol for about fifteen minutes. A purple coloration developed and the dye separated. The reaction mixture was chilled and the dye filtered off and washed with methyl alcohol. It was recrystallized from pyridine and obtained as minute red crystals.

EXAMPLE 6.—5-(1-ethyl-4-quinolylidene-ethylidene)-2-thio-2,4,6-triketohexahydropyrimidine

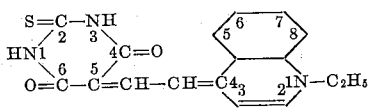

1.3 parts of 4-(β-anilinovinyl)-quinoline ethiodide, 0.5 part of thiobarbituric acid and 0.4 part of triethylamine were heated at the refluxing temperature in 15 cc. of absolute ethyl alcohol for about fifteen minutes. A purple coloration developed and the dye separated. The reaction mixture was chilled and the dye filtered off and washed with methyl alcohol. It was recrystallized from pyridine and obtained as violet crystals.

Cyclammonium quaternary salts containing a β-arylaminovinyl group in a reactive position can be prepared by well known processes. The following examples are illustrative.

EXAMPLE 7.—4-(β-anilinovinyl)-quinoline ethiodide 29.9 parts of lepidine ethiodide were intimately mixed with 19.6 parts of diphenylformamidine and the mixture heated at 150° C. to 160° C. for about ten minutes with stirring. The reaction mixture was cooled and then ground with acetone. The acetone-treated product was recrystallized from methyl alcohol and obtained as red crystals having a blue reflex.

EXAMPLE 8.—1-(β-acetanilidovinyl)-benzoxazole ethiodide 58 parts of 1-methylbenzoxazole ethiodide and 40 parts of diphenylformamidine and 270 parts of acetic anhydride were refluxed for about twenty minutes. The reaction product separated from the chilled reaction mixture. It can be employed without further purification.

EXAMPLE 9.—1-(β-acetanilidovinyl)-benzothiazole ethiodide 67 parts of 1-methylbenzothiazole ethiodide and 48 parts of diphenylformamidine and 395 parts of acetic anhydride were refluxed for about twenty minutes. The reaction product separated from the chilled reaction mixture. It can be employed without further purification.

EXAMPLE 10.—2-(β-anilinovinyl)-thiazoline methiodide 243 parts of 2-methylthiazoline methiodide and 196 parts of diphenylformamidine were intimately mixed together and the mixture heated at 140° C. for about ten minutes. 200 cc. of 95% ethyl alcohol were added while the reaction mixture was warm. The reaction product went into solution and then, when the solution cooled, crystallized out. It was filtered off and washed with ethyl alcohol.

In the above examples the parts given are by weight.

Diarylformamidines can be prepared as described by Claisen in Annalen, vol. 287, page 366 (1895) and by Comstock and Wheeler in the American Chemical Journal, vol. 13, page 516 (1891) and by Dains in the Berichte der deutschen chemischen Gesellschaft, vol. 35, pages 2498–2501 (1902).

My new dyes probably exist in two forms which are convertible the one into the other. These forms can be illustrated for the dyes of Formula I as follows:

Ia.
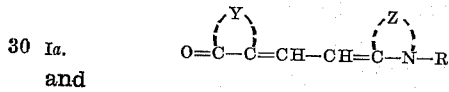

and

Ib.
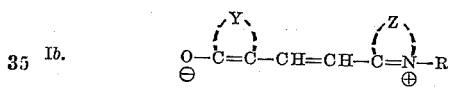

The preparation of cyclammonium aralkyl quaternary salts is described in the copending application of Leslie G. S. Brooker and Lloyd A. Smith, Serial No. 175,686, filed November 20, 1937. The preparation of cyclammonium alkoxyalkyl and carbalkoxyalkyl quaternary salts is described in the copending application of Leslie G. S. Brooker and Lloyd A. Smith, Serial No. 180,214, filed December 16, 1937.

What I claim as my invention and desire to be secured by Letters Patent of the United States is:

1. A dye characterized by a formula selected from the group consisting of the following formulas:

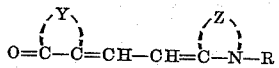

and

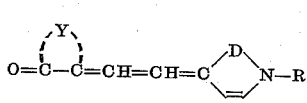

wherein D represents an organic group selected from the group consisting of vinylene and phenylene groups, R represents an alkyl group, Y represents the non-metallic atoms necessary to complete a barbituric acid nucleus and Z represents the non-metallic atoms necessary to complete a heterocyclic nucleus selected from the group consisting of five-membered and six-membered heterocyclic nuclei.

2. A dye characterized by the following formula:

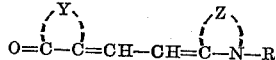

wherein R represents an alkyl group, Y represents the non-metallic atoms necessary to complete a barbituric acid nucleus and Z represents the non-metallic atoms necessary to complete a thiazole nucleus.

3. A dye characterized by the following formula:

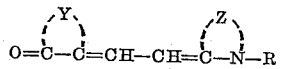

wherein R represents an alkyl group, Y represents the non-metallic atoms necessary to complete a barbituric acid nucleus and Z represents the non-metallic atoms necessary to complete a benzothiazole nucleus.

4. 5-(2-ethyl-1-benzothiazylidene-ethylidene)-2,4,6-triketohexahydropyrimidine.

5. A dye characterized by the following formula:

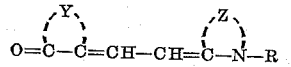

wherein R represents an alkyl group, Y represents the non-metallic atoms necessary to complete a barbituric acid nucleus and Z represents the non-metallic atoms necessary to complete an oxazole nucleus.

6. A dye characterized by the following formula:

wherein R represents an alkyl group, Y represents the non-metallic atoms necessary to complete a barbituric acid nucleus and Z represents the non-metallic atoms necessary to complete a benzoxazole nucleus.

7. 5-(2-ethyl-1-benzoxazylidene-ethylidene)-2,4,6-triketohexahydropyrimidine.

8. 5-(2-ethyl-1-benzoxazylidene-ethylidene)-2-thio-2,4,6-triketohexahydropyrimidine.

LESLIE G. S. BROOKER.